Sept. 24, 1940.  L. A. DUNAJEFF  2,216,097
AUTOMATIC PILOTING APPARATUS FOR BOATS
Filed Oct. 22, 1938
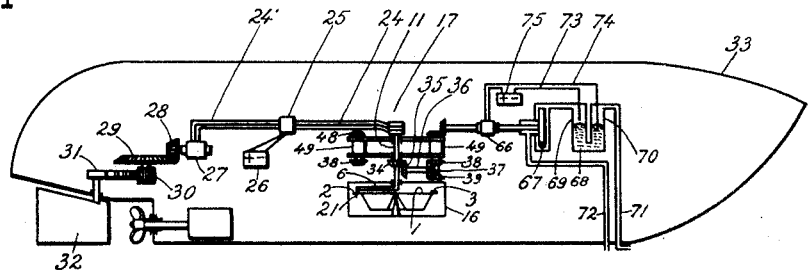
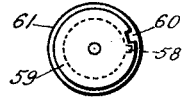
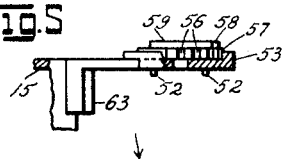
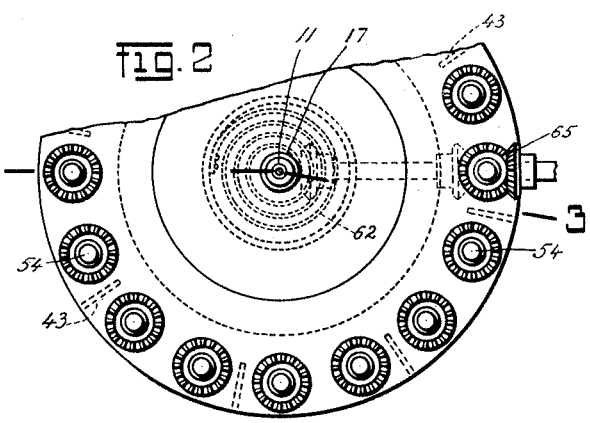
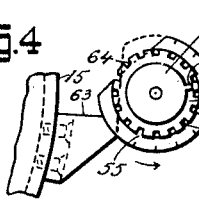
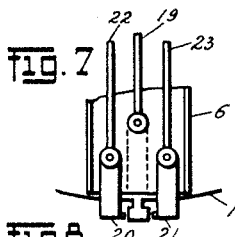
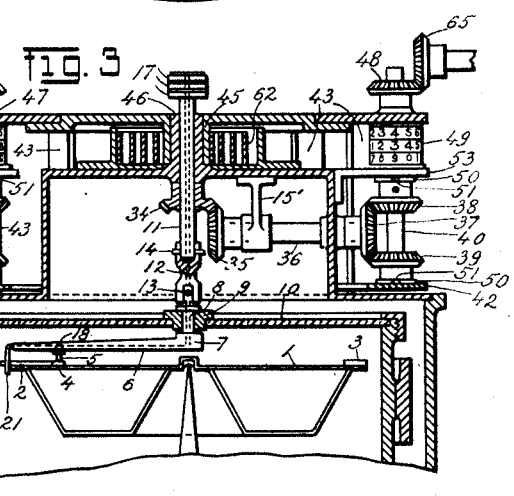
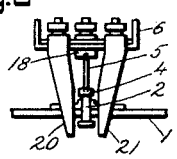
LEONID A DUNAJEFF
INVENTOR.
BY John P. Wilsonon
ATTORNEY.

Patented Sept. 24, 1940

2,216,097

UNITED STATES PATENT OFFICE 2,216,097

AUTOMATIC PILOTING APPARATUS FOR BOATS

Leonid A. Dunajeff, New York, N. Y., assignor to Commercial Ingredients Corporation, New York, N. Y.

Application October 22, 1938, Serial No. 236,419

12 Claims. (Cl. 114—144)

My invention relates to automatic piloting apparatus and has particular reference to compass controlled piloting apparatus for boats.

The subject matter of this application was disclosed and claimed in my application Serial No. 119,446, filed January 7, 1937.

During the war it often becomes necessary to lay submarine mines in waters patrolled by enemy ships or land guns, in which case ordinary mine-laying boats are not practical, and it is desirable to use boats operated and piloted automatically in order to avoid the loss of life in case of detection by the enemy.

The object of my invention is therefore to provide an automatic device for piloting a boat over a predetermined course without any human agency on board. For this purpose I provide an electrically operated steering mechanism for the rudder, controlling the motor by contact points adjustably supported at a magnetic or gyroscopic compass so as to cause the motor to rotate in one or the other direction in order to bring the boat back on the predetermined straight course in cases of even slight deviations.

Another object of my invention is to provide means to automatically change the course after the boat traveled a certain distance. This may be necessary in order to lay the mines on a zigzag course or along a more or less intricate route, specially charted for the mines and unknown to the enemy. For this purpose I use my distance and speed measuring apparatus as described in my United States Patent No. 1,451,064, in conjunction with a series of counting devices supported concentrically with the compass, each counter being set for a desired length of a straight run and for a desired change of course at the end of the run. The counters are successively brought into engagement with a driving mechanism operated by my speed and distance indicating device, thereby piloting the boat on a series of straight runs.

Upon completion of a straight run controlled by a counter connected with the driving mechanism, the counter turns the course-controlling pointer at the compass to a new position for a new course, releasing at the same time the frame for rotation whereby the next counter is brought into engagement with the driving mechanism. In this manner the course may be automatically changed as many times as there are counters on the frame.

My automatic piloting mechanism can be installed on any suitable boat powered by an internal combustion engine or electric motor. In the latter case a crewless small submarine may be employed to advantage.

My invention is more fully described in the accompanying specification and drawing in which—

Fig. 1 is a diagrammatic sectional view of a boat with my automatic piloting mechanism.

Fig. 2 is a fractional top plan view of my piloting mechanism.

Fig. 3 is a sectional elevational view of my piloting mechanism.

Fig. 4 is a detail view of a counter on a piloting mechanism.

Fig. 5 is a detail view of the same in another projection.

Fig. 6 is another detail view of a counter.

Fig. 7 is a detail view of contact points at the compass.

Fig. 8 is another detail view of the contact points.

My automatic piloting apparatus consists of a compass card, 1, magnetic or gyroscopic, having a contact bar 2 at one point on its surface balanced by a counter-weight 3. The contact bar is provided with a cup-shaped bearing 4 for a pin 5 the other end of which rests in a similar cup-shaped bearing in an arm 6 pivotally supported on a pin 7 in the lower end of a shaft 8 journaled in a bearing 9. The latter is supported in the center of a glass cover 10 of the compass. The shaft 8 is connected with a shaft 11 by a universal joint formed of a short shaft 12 having slotted ends for pins 13 and 14 on the ends of the shafts 8 and 11 at right angles to each other. The shaft 11 is journaled in a bracket 15 supported on the frame or casing 16 of the compass. The upper end of the shaft 11 has a collector with insulated contact rings 17. One of the rings is connected by an insulated wire (19, Fig. 7) with the bearing 18 and through the pin 5 with the bearing 4 and contact bar 2. The weight of the arm 6, resting on the bar 2, is also balanced by the counterweight 3.

The arm 6 has at its end two insulated contact plates 20 and 21 extending with a certain clearance at the sides of the contact bar 2. The plates are connected by insulated wires 22 and 23 with the other two collector rings 17. The latter are connected by contact brushes (not shown) and leads 24 with a relay box 25 which controls the current from a battery 26, or similar source of electric power, for an electric motor 27 connected by gears 28 and 29 with a pinion 30 turning a gear segment 31 of a rudder 32. The relays and connections are arranged so that the motor 27 turns the rudder in one direction when the contact plate 20 touches the bar 2, and in the other direction when the plate 21 touches the bar 2. It follows therefore that for any position of the arm 6, the automatic steering mechanism will maintain the boat 33 on such a course that the bar 2 will stay between the plates 20 and 21, and any deviation from the course will cause one or the other plate to touch the bar 2 thereby starting the motor 27 for turning the rudder in a proper direction for straightening the course.

A bevel gear 34 is rigidly mounted on the hollow shaft 11 and is in mesh with a gear 35 keyed on a cross shaft 36 journaled in the bracket 15 and provided with another bevel gear 37 keyed on its outer end. The gear 37 is in mesh with bevel gears 38 and 39 mounted on a tubular shaft 40 rotatively supported on a rod 41.

The latter is removably fitted by its end in a ring 42 suspended on bars 43 from an upper disc 44, shown formed of two concentric portions, which is rotatively mounted by its central tubular portion 45 on a corresponding tubular extension 46 on the bracket 15. Tubular shafts 47 are journaled in the disc 44 and form continuations of the shafts 40. Bevel gears 48 are mounted on the upper portions of the shafts 47, the lower portions being connected to the first or low mileage rings of the counters.

There is only one set of gears 35 and 37 but several counter assemblies with the gears 48 around the disc 44, only two being shown for clearness in Figs. 1 and 3.

The gears 38 are fastened to the shafts 40 while the gears 39 are free. Discs 50 are attached to the ends of the shaft 40 and are provided with slots 51 registering with pins 52 extending from clutch plates 53 of the counters. The rods 41 have thumbheads 54 for withdrawing them if it is desired to reverse the rotation of the counters, for which purpose the assembly of the gears 38 and 39 is turned over so that the free gear 39 becomes adjacent to the clutch plate 53, the drive being transmitted through the gear 38 as before. The clutch plate has an internal tooth 55 which can be placed in any of the slots 56 (Figs. 4 and 5) in an inner clutch plate 57, the slots being spaced at a certain angular distance apart. A tooth 58 on a hub 59 is adapted to engage an internal tooth 60 of a last or high mileage ring 61 of the counter, the engagement being effective when the counter rings are aligned on figures 9, the counter showing, for instance, 999. This condition takes place at the end of a run for which the counter was set, and then the shaft 47 becomes directly connected to the shaft 40, so that the gears 38, 37, 35 and 34 begin to rotate.

The disc 44 is connected with the bracket 15 by a spiral spring 62 wound so as to cause the disc to make one complete revolution but is prevented from rotation by a lug 63 extending from the bracket 15 and forming a stop resting against the clutch plate 53 as shown in Figs. 4 and 5.

A segment is cut off one side of the clutch plate forming a recess 64 so located that it clears the lug 63, releasing the disc 44 for rotation when the clutch plate is turned into position shown in dotted lines in Fig. 4. The disc when released makes a fraction of one revolution until the clutch plate comes in contact with the lug 63, when the next counter assembly becomes operative, the next gears 38 and 39 engaging the gear 37, and the next gear 48 meshing with a driving gear 65.

The gear 65 is mounted on the shaft of an electric motor 66 (Fig. 1) operating a pump 67 of my speed and distance indicating apparatus described in my Patent No. 1,451,064. The pump exerts a pressure on mercury 68 in a vessel 69 communicating with a vessel 70, the latter being connected at the top with a Pitot tube 71, the outer end of which is turned forward so as to receive the dynamic pressure of water due to its relative motion. The static pressure due to the submersion of the boat is balanced by a tube 72 connected with the intake of the pump. Contact wires 73 and 74 are placed in the vessels so that they remain above the level of mercury when pressure in one vessel is the same as in the other, when, for instance, the boat is not moving. When it is in motion, however, then pressure in the Pitot tube moves the mercury column down, raising the column in the pump vessel 69 and closing the contact between the wires thereby starting the motor, the wires 73 and 74 being connected with the motor through a battery 75. As the pump pressure equalizes the Pitot tube pressure, the contacts become opened and closed so as to maintain an average speed of the motor corresponding to the speed of the boat. It is to be noted that the Pitot tube pressure is proportional to the square of the speed of the boat, while the pump pressure is proportional to the square of the motor speed or its number of revolutions. Therefore, counting the latter, it is possible to measure the distance traversed by the boat through the water.

The operation of my apparatus is as follows: Every counter is set back from the final position 999 the desired number of units of length (miles, yards, etc.) which the boat must travel on a straight course. The corresponding clutch plates are set for an angle of turn for the next course, this being accomplished by placing the tooth 55 in a required notch in the disc 57.

Some of the assemblies of the gears 38 and 39 may be reversed in order to take care of right and left turns for the corresponding courses. Of course, not all of the available counter assemblies may be used if only a few turns are required. For extra long straight runs two or more counter assemblies can be set to work on one course. The spring 62 is wound and the first counter assembly is connected to the driving gear 65. The apparatus will then remain stationary until the boat begins to move, exerting pressure on the Pitot tube and causing the motor to rotate at the corresponding speed to balance this pressure in the communicating vessels 69 and 70. Upon completion of the first run, the first or operating counter registers figure 999, and after that the tooth 58 engages the tooth 60 (Fig. 6), causing the clutch to rotate through the angle for which it was set, until the recess 64 registers with the lug 63, releasing the disc 44 for rotation to the next counter, the second clutch plate coming to rest against the lug 63 and stopping the rotation. The gear 65 will be then in mesh with the second gear 48, and the second set of the gears 38 and 39 will be in mesh with the gear 37.

My automatic boat can be made to operate by electricity or by gasoline engines, placing sufficient amount of fuel on board for long distance cruise, the piloting device being set so as to cause the boat to return to its base at the end of the trip.

My piloting device can be used with any ordinary boats, steamers, or motorships, to guide their course throughout their trips and piloting them through channels in harbors, among reefs, etc. It is understood, of course, that my apparatus can be further modified without departing from the spirit of my invention.

I claim as my invention:

1. An automatic piloting apparatus for a boat, comprising a compass, an arm adjustably supported on the compass, contact points on the arm adapted to be operated by an indicating movable portion of the compass, an electrical steering apparatus, means to control the steering apparatus by the contact points, a motor, means to control the rotation of the motor by the speed of the boat, a plurality of counters movably supported in coordination with the compass and with the motor, means to successively move the counters into operative engagement with the motor, the counters being adapted to be set for the desired distances of straight courses for the boat, means to replace one counter by the next upon completion of a distance of travel determined by the first counter, and means to move the arm to a new position simultaneously with the replacement of the counters.

2. An automatic piloting apparatus for a boat, comprising a compass, contact points adjustably supported on the compass and adapted to be operated by an indicating movable portion of the compass, an electrical steering apparatus adapted to be controlled by the contact points, a motor, means to rotate the motor, means to control its rate of rotation by the speed of the boat, a frame rotatively supported in coordination with the compass, a plurality of counters on the frame, means to rotate the frame, the counters being adapted to be successively brought into operative engagement with the motor, means to retain a counter in engagement with the motor, the counters being adapted to be set for desired distances of travel, means to render the retaining means inoperative by moving it by the operating counter through a predetermined angle upon completion of the travel on the course for which said counter is set, and means to move the contact points at the compass through an angle corresponding to the angle of the retaining device for the next counter engaged by the motor.

3. An automatic piloting apparatus for a boat, comprising a compass, an electrically operated steering gear, contact points adjustably supported on the compass and adapted to be operated by an indicating movable portion of the compass, the contact points being adapted to control the steering mechanism for maintaining the boat on a course determined by the position of the contact points, a frame rotatively supported in coordination with the compass, a plurality of counters on the frame, means to rotate the frame for successively bringing the counters into an operative position, a motor, means to control the rate of rotation of the motor by the speed of the boat, means to turn the counter in the operative position by the motor, the counter being adapted to record the distance traveled by the boat, the counters being adapted to be set for different distances of travel, an adjustable member adapted to be rotated by the counter through a predetermined angle upon completion of a distance by the boat for which the counter is set, means to displace the contact points by the member through the same angle, and means on the member for releasing the frame for rotation thereby bringing the next counter into the operative position, said releasing means being adapted to become operative upon completion of its rotation by the member.

4. An automatic piloting apparatus for a boat having a compass and an electrically controlled steering mechanism, comprising an arm movably supported at the compass, means on the arm controlled by the compass for controlling the steering mechanism to maintain the boat on a straight course determined by the position of the arm, an electric motor, means to control the number of revolutions of the motor by the distance traversed by the boat, means to measure the distance traversed by the boat by the number of motor revolutions, means to move the arm, an adjustable means on the measuring means to release the arm at the end of a predetermined distance of the boat travel for movement through a predetermined angle, and a second measuring means adapted to be operatively connected with the motor at the new position of the arm.

5. An automatic piloting apparatus for a boat having a compass and an electrically controlled steering mechanism, comprising means to control the steering mechanism by the compass for maintaining the boat on a straight course, a plurality of counters movably supported at the compass, a motor, means to control the number of motor revolutions by the distance traversed by the boat, means to successively move the counter into an operative engagement with the motor, the counters being adapted to measure the distance traversed by the boat by the number of motor revolutions, the counters being adapted to be set for predetermined distances of boat travel, means on the counters for releasing the engagement with the motor at the end of a straight run, means to release the counters so as to bring the next counter into engagement with the motor, and means on the counters for changing the course of the boat at the end of the straight course.

6. An automatic piloting apparatus for a boat having a compass and an electrically controlled steering mechanism, comprising means to control the steering mechanism by the compass for maintaining the boat on a predetermined straight course, a frame movably supported at the compass, a plurality of counters on the frame, a motor, means to control the number of the revolutions of the motor by the distance traversed by the boat, means to move the frame for bringing the counters successively into operative engagement with the motor, the counters being adapted to measure the distance traversed by the boat by the number of motor revolutions, the counters being adapted to be set for predetermined distances of straight travel of the boat, and to be released at the end of said distances, and adjustable means on the counters for changing the course of the boat at the end of the corresponding straight travel.

7. An automatic piloting apparatus for a boat having a compass and an electrically operated steering mechanism, comprising an arm movably supported at the compass, means on the arm controlled by the compass for controlling the steering mechanism for maintaining the boat on a predetermined straight course, a motor, a hydraulic means to control the number of revolutions of the motor in proportion to the distance traversed by the boat, means to measure the distance traversed by the boat by the number of revolutions of the motor, means to move the arm, an adjustable means on the measuring means to release the arm for a movement through a predetermined angle at the end of a predetermined distance of boat travel, thereby causing the boat to take a new course corresponding to a new position of the arm.

8. An automatic piloting apparatus for a boat having a compass and an electrically controlled steering mechanism, comprising means to control the steering mechanism by the compass for maintaining the boat on a predetermined straight course, a frame movably supported at the compass, a plurality of adjustable distance indicating elements on the frame, a motor, means to control the number of the revolutions of the motor by the distance traversed by the boat, means to move the frame for bringing successively the distance indicating elements into operative engagement with the motor, the distance indicating elements being adapted to measure the distance traversed by the boat by the number of motor revolutions, and being further adapted to be set for predetermined distances of straight travel of the boat, and to be released at the end of said distances, and adjustable means on the distance indicating elements for changing the course of the boat at the end of the corresponding straight travel.

9. An automatic piloting apparatus for a boat having a compass and an electrically controlled steering mechanism, comprising means to control the steering mechanism by the compass for maintaining the boat on a predetermined straight course, a frame movably supported at the compass, a plurality of distance indicating elements on the frame, means responsive to the relative velocity between the boat and water, adapted to operate the distance indicating elements, the distance indicating elements being adapted to be set for a predetermined distance each, means to move the frame, means to hold the frame stationary while one of the distance indicating elements is connected with the distance measuring means, means to release the frame when said distance indicating means completes its operation for the distance for which it was set thereby permitting the frame to be moved until the next distance indicating element is engaged by the distance measuring means, and an adjustable means on the distance indicating elements for changing the direction of movement of the boat by a predetermined angle.

10. An automatic piloting apparatus for a boat having a compass and an electrically controlled steering mechanism, comprising an arm movably supported at the compass, means on the arm controlled by the compass for controlling the steering mechanism to maintain the boat on a straight course determined by the position of the arm, a frame supported for rotation on an axis concentric with the axis of rotation of the arm, a plurality of rotary distance indicating elements supported peripherally on the frame, a motor, means to rotate the motor by the movement of the boat so as to maintain the number of motor revolutions proportional to the distance traversed by the boat, means to operatively connect one element with the motor and to retain the frame stationary, the elements being adapted to be set for a predetermined distance of boat travel, means to release the element from the motor upon completion by the element of the distance for which it was set thereby also releasing the frame, means to rotate the frame until the next element becomes operatively engaged by the motor, and an adjustable means on the elements to rotate the arm to a new position by the motor when the element completes its rotation and releases the frame for rotation.

11. An automatic piloting mechanism for a boat having a steering mechanism operable by an electric motor with a reversing switch, comprising a compass having a rotatively supported indicating member, a contact bar on the indicating member, an arm positioned above the indicating member, a shaft rotatively supported above the indicating member concentrically therewith, the arm being supported on the lower end of the shaft, contact points of the arm at either side of the contact bar, electric connections extending from the contact points and from the contact bar to the motor reversing switch for reversing the rotation of the motor when the contact bar moves from one contact point to the other, a spring adapted to rotate the shaft with the arm, means to hold the arm in a desired position, means to release the arm holding means, means to indicate the distance traversed by the boat, and means to control the releasing means by the distance indicating means.

12. An automatic piloting mechanism for a boat having a steering mechanism operable by an electric motor with a reversing switch, comprising a compass having a rotatively supported indicating member, a contact bar on the indicating member, an arm positioned above the indicating member, a shaft rotatively supported above the indicating member concentrically therewith, the arm being supported on the lower end of the shaft, contact points on the arm at either side of the contact bar, electric connections extending from the contact points and from the contact bar to the motor reversing switch for reversing the rotation of the motor when the contact bar moves from one contact point to the other, a spring adapted to rotate the shaft with the arm, means to hold the arm in a desired position, means to release the arm holding means, means to indicate the distance traversed by the boat, means to control the releasing means by the distance indicating means, and means to control the movement of the arm into a new position by the distance indicating means.

LEONID A. DUNAJEFF.